United States Patent [19]

Luxa et al.

[11] 4,035,693

[45] July 12, 1977

[54] SURGE VOLTAGE ARRESTER WITH SPARK GAPS AND VOLTAGE-DEPENDENT RESISTORS

[75] Inventors: Gunther Luxa; Klaus Reichelt; Rudolf Pratsch, all of Berlin, Germany

[73] Assignee: Siemens Aktiengesellschaft, Munich, Germany

[21] Appl. No.: 509,538

[22] Filed: Sept. 26, 1974

Related U.S. Application Data

[63] Continuation-in-part of Ser. No. 485,085, July 2, 1974, abandoned.

[51] Int. Cl.² .......... H02H 3/22

[52] U.S. Cl. .......... 361/120; 361/129; 361/127

[58] Field of Search .......... 317/62, 67, 68, 69, 317/70, 61, 61.5; 315/35, 36; 313/DIG. 5; 200/148 E

[56] References Cited

U.S. PATENT DOCUMENTS

| | | | |
|---|---|---|---|
| 2,757,261 | 7/1956 | Lingal et al. | 317/11 D X |
| 3,624,450 | 11/1971 | Graybill | 317/62 |
| 3,727,108 | 4/1973 | Westrom | 317/68 |
| 3,733,521 | 5/1973 | Kalb | 317/70 |
| 3,778,743 | 12/1973 | Matsuoka et al. | 338/21 |
| 3,806,765 | 4/1974 | Matsuoka et al. | 317/61 |
| 3,842,018 | 10/1974 | Ichinose et al. | 338/21 X |
| 3,842,318 | 10/1974 | Nitta | 317/62 |

*Primary Examiner*—J D Miller
*Assistant Examiner*—Patrick R. Salce
*Attorney, Agent, or Firm*—Kenyon & Kenyon, Reilly, Carr & Chapin

[57] ABSTRACT

A surge voltage arrester contains a series circuit arrangement of spark gaps and voltage-dependent resistors. The voltage-dependent resistors include a semiconductive material having an exponent $\alpha$ of voltage dependence which is at least 10. The surge voltage arrester makes it possible to manufacture high-capacity surge voltage arresters with spark gaps exhibiting a very simple construction. This effect is based on the fact that the voltage-dependent resistors assume the actual arrester function and the spark gap, therefore, are essentially only used for switching the arrester on and off. The arrester is particularly suitable for application in networks for electrical power distribution.

7 Claims, 2 Drawing Figures

SURGE VOLTAGE ARRESTER WITH SPARK GAPS AND VOLTAGE-DEPENDENT RESISTORS

RELATED APPLICATIONS

This application is a continuation-in-part of application Ser. No. 485,085, filed July 2, 1974, and now abandoned.

BACKGROUND OF THE INVENTION

A form of voltage arrester having a series circuit arrangement of voltage-dependent resistors and spark gaps as their primary component is known. It is further known to use voltage arresters of this type for protecting electrical operating equipment and installations for distributing power against surge voltages. The operation of these arresters is such that the spark gaps respond at a certain voltage level and that the energy contained in an over-voltage wave is discharged through the series circuit. In this manner, the surge voltages can have no damaging effect on the operating equipment or installations. Because of the voltage dependence of the resistor elements, the follow-on current caused by the system voltage is reduced to the extent that the spark gaps are able to interrupt it. The surge voltage arrester thereby returns to its non-conducting state.

It was possible in recent years to further improve the capacity of surge voltage arresters through the development of current-limiting spark gaps which supported the action of the voltage-dependent resistors. Spark gaps of this type are relatively costly since they require generally blow-out coils and complex quenching chambers which cause a lengthening of the electric arcs ignited between the electrodes.

Furthermore, surge voltage arresters for low operating voltages became known which include only voltage-dependent resistors and which therefore do not require spark gaps. In contrast to the surge voltage arresters of the type described first, these voltage-dependent resistors do not consist of silicon carbide but, rather, of a different semi-conductive resistance material based on zinc oxide doped with additional metal oxides. This resistor material exhibits a stronger voltage dependence than silicon carbide and therefore possesses a more pronounced valve action.

The application of surge voltage arresters utilizing metal-oxide resistors of the type mentioned is, however, limited to applications where a high ratio between residual voltage and extinguishing voltage is permissible. This circumstance exists in low-voltage networks where for instance the peak value of the extinguishing voltage amounts to 400 volts and where a residual voltage with a peak value of 2000 volts can be tolerated. Such a high ratio between residual voltage and extinguishing voltage is, however, already no longer permissible in medium voltage networks. For a peak value of the extinguishing voltage of 17 kV the here maximum permissible residual voltage amounts to 40 kV. The known metal-oxide resistors cannot be adapted to these conditions. A residual current flows during the peak value of the extinguishing voltage which would quickly destroy the resistor body.

SUMMARY OF THE INVENTION

The invention relates to a surge voltage arrester having a series connection of spark gaps and voltage-dependent resistors. It is an object of the invention to provide such a surge voltage arrester having improved response characteristics and a capacity which is particularly suited for application in medium and high-voltage installations.

According to a feature of the surge voltage arrester of the invention, the voltage-dependent resistors thereof include a seim-conductive material having an exponent $\alpha$ of the voltage dependence having a value of at least 10. This voltage dependence is considerably greater than that of the known resistors made of silicon carbide which so far have been used in conjunction with spark gaps in surge voltage arresters. Consequently, the resistors effectuate a considerably greater current limiting action thereby relieving the spark gaps. As a result, the spark gaps can be of simpler configuration and are less expensive than heretofore.

For the purpose of better understanding the invention, it is mentioned that the current density $j$ in the discharge resistor follows the relation $$j = j_o \left( \frac{E}{E_o} \right)^{\alpha}$$

and that the discharge current $i$ follows the relation $$i = i_o \left( \frac{U}{U_o} \right)^{\alpha}$$

In the above equations, $E$ represents the voltage drop per unit of length on the discharge resistor, $U$ represents the voltage at the discharge resistor, $j_o$ and $i_o$ represent the unit values of the current density and current, respectively, and $E_o$ and $U_o$ represent constants. The voltage dependence is characterized by the exponent $\alpha$ Although values $\alpha$ of semi-conductive resistor materials based on metal-oxides, as they are specifically considered for the purposes of the invention, may depend on the magnitude of the discharge current, their values overall are nevertheless considerably higher than for the known siliconcarbide resistors. An average value $\alpha$ for resistors made of silicon-carbide of 5 can be assumed, whereas, metal-oxide resistors exhibit values between 10 and 30.

As already mentioned, resistor materials based on metal-oxides are in particular suited for the purposes of the invention. In particular, good results can be obtained with a resistor material which consists predominantly of zinc-oxide and which is doped with other metal-oxides. Materials with these properties are for instance described in Deutsche Offenlegungsschrift 1,952,841.

Since the spark gaps of the surge voltage arrester according to the invention have been greatly relieved, they may be of relatively simple configuration; of advantage are spark gaps which define a largely uniform electrostatic field, as can be achieved through plate electrodes. Apart from the advantage of reducing the cost of the surge voltage arrester, a considerable improvement of the response characteristic is hereby also attained, since spark gaps with a uniform electrostatic field possess only a rather small dependence of the response voltage on the slope of the voltage phenomena. Therefore, the means used so far to influence the response characteristic can be dispensed with.

The invention is of particular advantage in connection with the proven insulation gas sulfur hexafluoride which is used for the insulation of metal-clad high-voltage installations. It is however already known from U.S. Pat. No 2,757,261 to accommodate spark gaps and voltage-dependent resistors of conventional construction in a housing filled with sulfur hexafluoride; however, in practical applications, specifically for increased pressure, difficulties have resulted since, because of the greater insulating capability of this gas, the number of spark gaps will have to be reduced for the same response voltage thereby resulting in a decrease of the extinguishing capability. Since in the surge voltage arrester according to the invention, the extinguishing capability of the spark gaps is of subordinate significance, the arrester can be adapted to the changed conditions in a simple way. This means a substantial simplification for the installation of surge voltage arresters in high-voltage systems such as switching installations or tube conductors which are filled with sulfur hexafluoride. It is now possible without disadvantages for the functioning of the arresters to use the same insulating gas for the installation and the arresters. In comparison, for the use of conventional arresters with nitrogen atmosphere within high-voltage systems filled with sulfur hexafluoride, special measures are necessary to avoid penetration of the sulfur hexafluoride gas of the high-voltage system into the surge voltage arrester and vice versa or, to take into consideration the effects of such a gas passage.

Although the invention is illustrated and described herein as a surge voltage arrester with spark gaps and voltage-dependent resistors, it is nevertheless not intended to be limited to the details shown, since various modifications may be made therein within the scope and the range of the claims. The invention, however, together with additonal objects and advantages will be best understood from the following description and in connection with the accompanying drawings.

DESCRIPTION OF THE PREFERRED EMBODIMENTS OF THE INVENTION

Figure 1:
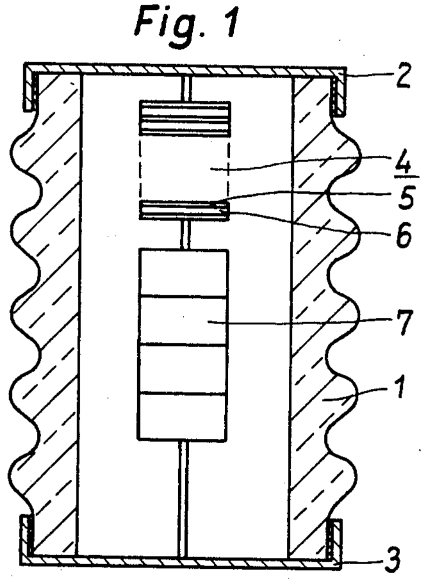
FIG. 1 is a schematic diagram, partially in section, of a surge voltage arrester according to the invention.

FIG. 1 shows a surge voltage arrester for medium voltages with a housing 1 shaped in the conventional manner and made of a suitable insulating material such as porcelain. The housing 1 is sealed by means of fittings 2 and 3 which at the same time serve for the electrical connection of the surge votage arrester. In the interior of the housing 1 is assembled a series circuit arrangement of spark gaps 4 with plate electrodes 5, spacing pieces 6 made of insulating material and resistor bodies 7 of zinc-oxide which are doped with additional metal-oxides. The number of spark gaps 4 and resistor bodies 7 as well as the size of these elements depend on the desired voltage values and the required discharge current which the surge voltage arrester is intended to handle.

Figure 2:
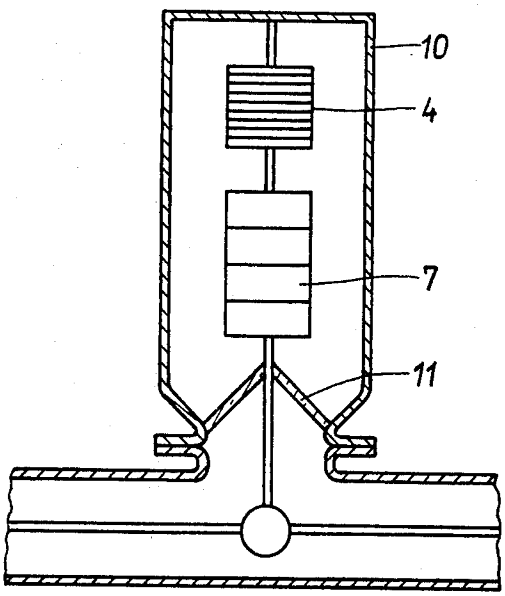
FIG. 2 is a schematic diagram of an alternate embodiment of the surge voltage arrester according to the invention. The surge voltage arrester is here shown adapted for use with equpment having a gas-tight housing.

FIG. 2 shows an alternate embodiment of the surge voltage arrester of the invention wherein the series circuit arrangement consisting of spark gaps 4 and resistor bodies 7 is accommodated in a hermetically sealed housing 10 in an atmosphere of sulfur hexafluoride. Such a surge voltage arrester is suited in particular for application in metal-clad electrical high-voltage systems such as switching installations or tube conductors which are insulated with sulfur hexafluoride. It is recommended to separate the space containing the active components of the surge voltage arrester by means of a feedthrough 11 from the remaining gas-containing space of the system; it does mean, however, a simplification for the configuration of the system if the same gas can be used for the system insulation and for the filling of the surge voltage arrester. In contrast, the known surge voltage arresters are, as a rule, filled with a different insulating gas, preferably nitrogen. In this case, difficulties can come up when, as a result of leaks, the gas chambers communicate with each other. Accordingly, the feedthrough 11 serves the purpose of separating the interior of the housing 10 of the overvoltage arrester from the interior of the rest of the switching installation so that no gas can penetrate into the housing 10 or can escape from it.

As already mentioned, the resistance elements 7 can be prepared with known compositions and by known methods. The following composition has been found to be a suitable mixture of metal oxides:

87.7% by weight $Zn0$
8.7% by weight $Bi_20_3$
1.7% by weight $Sb_20_3$ 0.9% by weight $Cr_20_3$
0.5% by weight $Co0$
0.5% by weight $Mn0_2$ These metal oxides are mixed carefully and subsequently pressed to form a body of suitable shape and subjected to a treatment at high temperature. Subsequently, the opposing surfaces of the resistance element are provided with a conductive coating, for instance, by vapor-depositing, spraying-on or burning-in a metal or a suitable alloy. The resistance elements prepared in this manner can then be connected individually or in series with each other, as shown in FIGS. 1 and 2, to current-carrying conductors.

What is claimed is:

1. In a surge voltage arrester for conducting a discharge current between to locations, the arrester having a plurality of voltage-dependent resistors and a plurality of spark gap structures; said resistors and said spark gap structures conjointly defining a series circuit connectable between the two locations, said resistors being made of a semiconductor material having a voltage-dependent exponent $\alpha$ said exponent $\alpha$ having a value of at least 10, wherein the improvement comprises each of said spark gap structures being made up of two electrodes conjointly defining a spark gap therebetween, said electrodes being configured so as to conjointly define a substantially uniform electrostatic field in the gap corresponding thereto.

2. The surge voltage arrester of claim 1, each of said voltage-dependent resistors being made of a material comprising metal-oxides.

3. The surge voltage arrester of claim 2, said material being zinc-oxide doped with metal-oxides.

4. The surge voltage arrester of claim 1, said spark gap means being a plurality of serially connected structures defining respective spark gaps, each of said structures comprising mutually adjacent plate electrodes defining a corresponding one of said gaps.

5. The surge voltage arrester of claim 1 comprising a housing filled with sulfur hexafluoride gas, said plurality of voltage-dependent resistors and said spark gap means being arranged within said housing.

6. The surge voltage arrester of claim 5 wherein the arrester is adapted for use with an installation having a metalclad enclosure filled with sulfur hexafluoride gas, said housing of said arrester extending from said metalclad enclosure.

7. The surge voltage arrester of claim 1, said exponent $\alpha$ having a value in the range from 10 to 30.

* * * * *